(12) United States Patent
McFarland

(10) Patent No.: US 10,851,554 B1
(45) Date of Patent: Dec. 1, 2020

(54) FILTRATION OF WAVE GENERATOR WITH WAVE DAMPENING

(71) Applicant: American Wave Machines, inc., Solana Beach, CA (US)

(72) Inventor: Bruce McFarland, Solana Beach, CA (US)

(73) Assignee: American Wave Machines, Inc., Solana Beach, CA (US)

( * ) Notice: Subject to any disclaimer, the term of this patent is extended or adjusted under 35 U.S.C. 154(b) by 0 days.

(21) Appl. No.: 16/795,483

(22) Filed: Feb. 19, 2020

Related U.S. Application Data

(60) Provisional application No. 62/885,768, filed on Aug. 12, 2019.

(51) Int. Cl.
*E04H 4/00* (2006.01)
*C02F 1/00* (2006.01)
*C02F 103/42* (2006.01)

(52) U.S. Cl.
CPC .......... *E04H 4/0006* (2013.01); *C02F 1/004* (2013.01); *C02F 2103/42* (2013.01)

(58) Field of Classification Search
CPC ..... E04H 4/0006; C02F 1/004; C02F 2103/42
USPC .............................................................. 4/491
See application file for complete search history.

(56) References Cited

U.S. PATENT DOCUMENTS

| | | | |
|---|---|---|---|
| 2,406,413 A * | 8/1946 | Test | E04H 4/1209 |
| | | | 4/498 |
| 4,627,118 A | 12/1986 | Baker | |
| 4,692,949 A * | 9/1987 | Dunn | E04H 4/0006 |
| | | | 4/491 |
| 4,999,860 A * | 3/1991 | Chutter | E04H 4/0006 |
| | | | 4/491 |
| 6,582,315 B1 | 6/2003 | Formanski | |
| 2011/0061194 A1 | 3/2011 | Torres | |
| 2011/0062067 A1 | 3/2011 | Torres | |
| 2011/0210076 A1 | 9/2011 | Torres | |
| 2013/0074254 A1* | 3/2013 | Payne | E04H 4/0006 |
| | | | 4/491 |
| 2013/0216398 A1 | 8/2013 | Stephens | |
| 2018/0087284 A1 | 3/2018 | McFarland | |

FOREIGN PATENT DOCUMENTS

| | | |
|---|---|---|
| AU | 2006/201905 | 11/2006 |
| WO | 00/05464 | 2/2000 |

OTHER PUBLICATIONS

International Search Report for PCT/US20/21576 dated Jun. 15, 2020.

* cited by examiner

*Primary Examiner* — Tuan N Nguyen
(74) *Attorney, Agent, or Firm* — Manuel de la Cerra

(57) ABSTRACT

A wave generating apparatus is provided, comprised of a wave pool, a wave generating chamber, and a filtration system. The filtration system comprises an intake, a pressurized return that releases water, and a filtration pump that pumps water from the intake to a pressurized return while filtering debris from the water. The pressurized return is located at a higher elevation relative to the intake. Water flows directionally from the pressurized return to the intake.

24 Claims, 3 Drawing Sheets

Section A-A

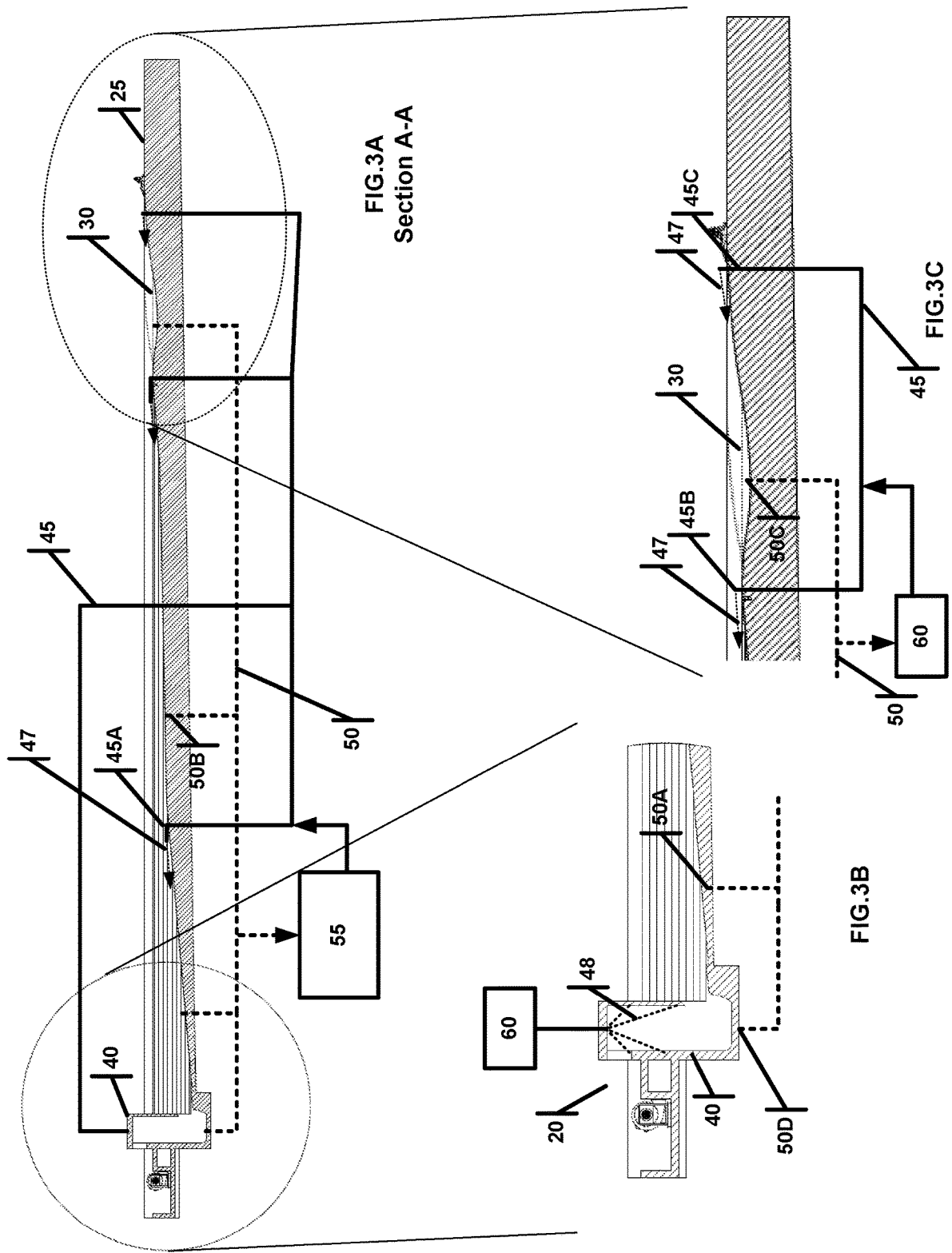

US 10,851,554 B1

FILTRATION OF WAVE GENERATOR WITH WAVE DAMPENING

1.0 TECHNICAL FIELD

The present invention relates generally to a wave forming apparatus and is partially concerned with water rides of the type provided in water-based amusement parks, particularly a wave forming apparatus and method for forming surfable waves, or a water toy.

2.0 RELATED APPLICATIONS

This application is the non-provisional of U.S. Patent Application No. 62/885,768, filed on Aug. 13, 2019, the entire contents of which are incorporated herein by reference.

This application claims priority as the non-provisional of U.S. Patent Application No. 62/885,768, filed on Aug. 13, 2019. This application is also related to U.S. patent application Ser. No. 15/277,521, filed on Sep. 27, 2016, and is also related to U.S. patent application Ser. No. 15/841,166, filed on Dec. 13, 2017, and is also related to U.S. patent application Ser. No. 14/808,076, filed on Jul. 24, 2015, and is also related to U.S. patent application Ser. No. 15/246,233, filed on Aug. 24, 2016. The disclosures of each of these applications are herein incorporated by reference in their entireties.

3.0 BACKGROUND

Wave generators are often used for recreational purposes. Wave generators create one or more waves in a pool or the like, and people typically either play in the waves or use the waves for aquatic sports such as board sports. Aquatic board sports, such as surfing and bodyboarding, require that the waves be rideable. Enthusiasts in these types of sports often use wave generators for competition, practice and entertainment.

Existing wave generators can use wave generating chambers to produce a wave that travels in a direction where the peak of the wave is substantially parallel to the chambers and the beach as it travels from the chambers toward the beach to the wave generating apparatus, and the wave is produced when the wave generating chambers (either one chamber or multiple chambers) are all activated simultaneously, resulting in the water being pushed away from the wave generating chambers, which then travels at an angle away from the chambers. Such a system is disclosed in U.S. Pat. No. 9,103,133 and patent application Ser. No. 15/246,233, filed on Aug. 24, 2016, the contents of both of which are incorporated herein by reference.

These wave pools need effective filtration schemes to clean the sand and debris from the wave generating chambers.

4.0 SUMMARY

The wave generating apparatus of the present invention presents an elegant and effective solution to circulate and to clean the water in the wave pool and the wave generating chambers, to filter out debris, and to remove scum from the chamber walls.

In one aspect, the wave generating apparatus presents a filtration scheme where the filtration system comprises a pressurized return, a pool intake, and a filtration pump that pumps water from the pool intake to the pressurized return. The filtration pump filters and pressurizes the water to the pressurized return such that the water flows from the pool intake (which is at negative pressure i.e., vacuum) to the pressurized return. In alternative embodiments, the wave generating apparatus may have more than one pump, and a first pump may be used for filtration while a secondary pump pressurizes the water going to the pressurized returns. The system may also comprise a plurality of pressurized returns and/or a plurality of pool intakes rather than just one of each.

In another aspect, the wave generating apparatus may include a pump that pumps water from one or more intakes to a pressurized return located inside the chamber. A secondary pump may be used to pressurize the water. The wave generating chamber pressurized return may be a sprinkler, and the pressurized water removes debris and buildup on the chamber walls. In alternative embodiments, there may be a plurality of pressurized returns inside the wave generating chamber. There may also be an intake located in the interior of the wave generating chamber.

In still another aspect, the wave generating apparatus may include a wave dampening trough with its own intake and pressurized return. A secondary pump may be provided to filter the water in the wave dampening trough from the intake to the pressurized return. The pump can also be operated to drain water away from the wave dampening trough through the intake for cleaning or other purposes. The pump may also be operated to fill the water in the wave dampening trough via the return. In the drain mode, the return to the trough is off, and the pump may pump water to a pool return instead of to the trough return. In the fill mode, the trough intake is off.

Other aspects of the invention are disclosed herein, as discussed in the following Drawings and Detailed Description.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

FIG. 3A is the cross-sectional view along cross-section A-A shown in FIG. 2.

FIG. 3B is an enlarged section of the wave generator chamber in FIG. 3A.

FIG. 3C is an enlarged section of the wave dampening trough and beach edge in FIG. 3A.

6.0 DETAILED DESCRIPTION

Figure 1:
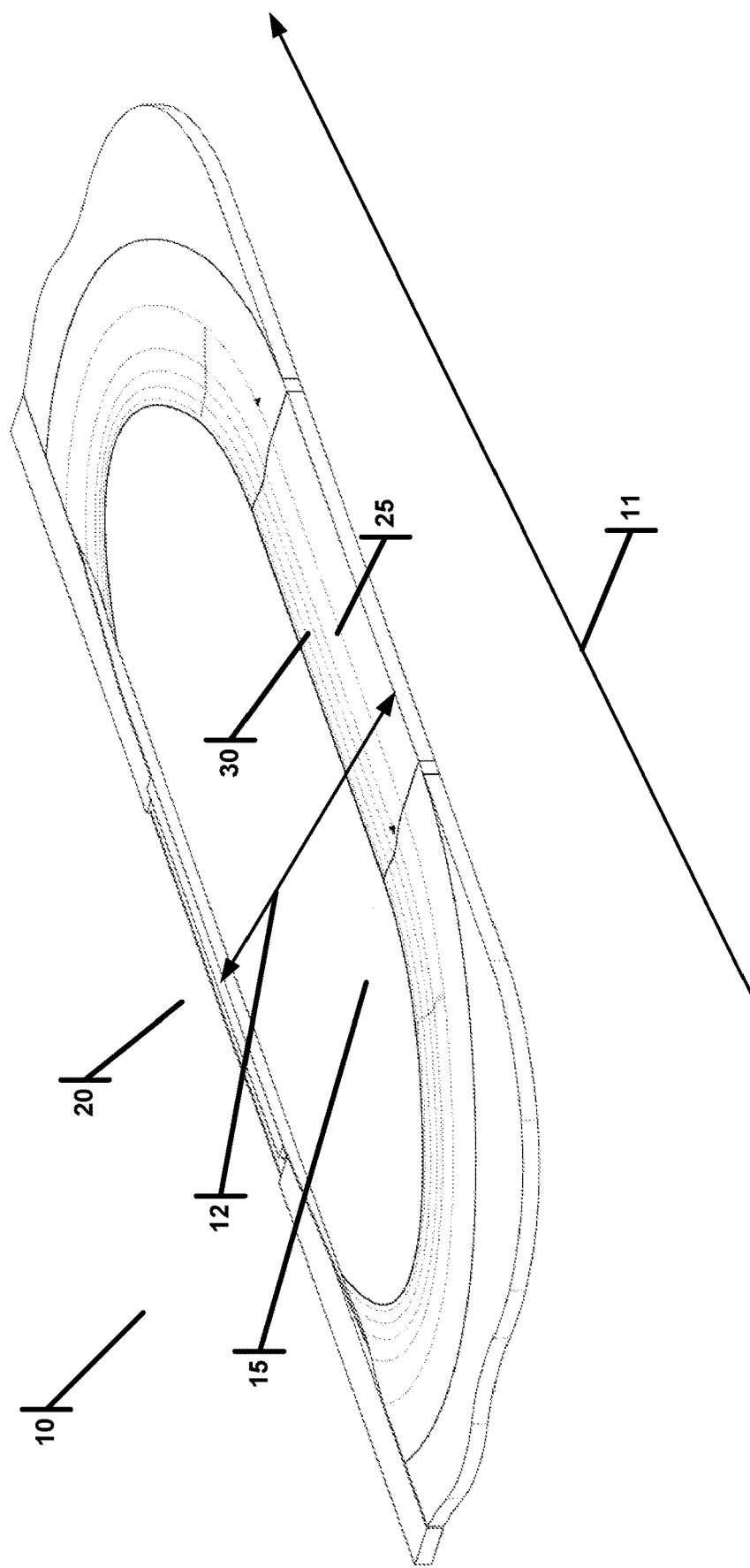
FIG. 1 is an isometric view of a wave generating apparatus with a novel wave dampening trough.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 2:
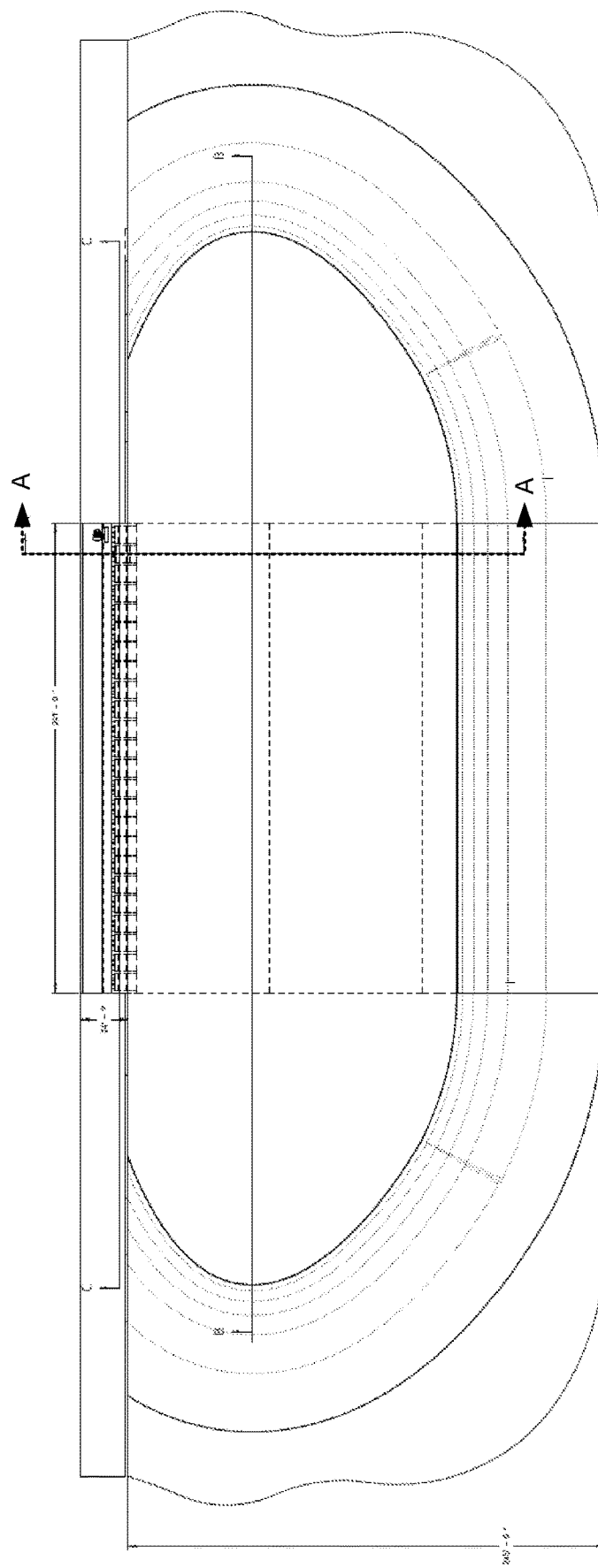
FIG. 2 is a top view of the wave generating apparatus with a cross-section A-A indicated.

The following list of example features corresponds with the attached figures and is provided for ease of reference, where like reference numerals designate corresponding features throughout the specification and figures:

10 Wave generating apparatus
11 Apogee
12 Perigee
15 Wave pool
20 Wave generator(s)
25 Beach edge of pool
30 Wave dampening trough
40 Wave generating chamber(s)
45 Return(s) (pressurized)
45A, 45B, 45C (Pressurized) Return
47 Direction of Pressurized Return
48 Wave Chamber Pressurized Return(s)
50 Intake(s)
50A, 50B, 50C, 50D Intake
55 Filtration Pump
60 Secondary Pump The present invention is illustrated in FIGS. 1-3, which illustrate a wave generating apparatus 10 with an oval wave pool 15 having an apogee of 750 feet (line 11) and a perigee of 245 feet (line 12). The wave generating apparatus 10 is comprised of a wave pool 15, a wave generating chamber 40, and a filtration system comprised of a pool intake 50, and a return 45, and a filtration pump 55, which pumps water from the pool intake to the pressurized pool return while filtering debris from the water. The return(s) 45 are located at a higher elevation relative to the pool intake(s) 50, and the pressurized water flows in the direction 47 from the return(s) 45 towards the pool intake(s) 50. The wave pool 15 further comprises a first deep end of the wave pool and a second more shallow end of the wave pool. The one or more wave generating chamber(s) 40 may have one or more wave generators 20, and can be located adjacent to the first deep end of the wave pool 15. FIG. 3B illustrates an enlargement of the wave generating chamber 40.

The wave pool 15 shown in FIGS. 1-3 has a bottom with two portions: the first portion has an angle of inclination relative to horizontal that is steeper than the angle of inclination of the second portion of the pool bottom. In other words, the angle of inclination moving from the first end of the wave pool toward the second end of the wave pool decreases relative to horizontal. The variance in steepness assists in creating the wave. The pool bottom may alternatively have a single angle of inclination or multiple angles of inclination. The wave generating apparatus 10 has a beach edge 25 nearer to the second portion of the pool bottom. When the wave generator 20 is not actuated, the wave pool 15 retains water defining a static water level, and a portion of the beach edge 25 is above the static water level. In the embodiment illustrated in FIGS. 1-3, a portion of the beach edge 25 is at grade level and is two feet above the static water level. Adjacent to the beach edge 25, the wave generating apparatus 10 may have an open wave dampening trough 30 that also retains water at the static water level when the wave generator 20 is not actuated. FIG. 3C illustrates an enlargement of the trough 30 and the beach edge 25.

Conventional pool filtration techniques will not work with such a large wave chamber. Further, without a filtration scheme directed at also cleaning the inside of the wave generating chamber 40, the chamber walls may experience build-up of debris and pool scum, which can affect the wave generation and water quality.

FIGS. 3A-3C illustrate a filtration scheme that effectively cleans the wave pool 15, the wave generating chambers 40, and the wave dampening trough 30. In FIG. 3A, the solid lines 45 represent the (pressurized) return lines, and the dashed lines represent the intake lines 50. These lines are connected to the filtration pump 55. The water released by the pressurized returns 45 can travel in the direction 47, so that water carries debris to the intakes 50 that are located at a lower elevation of the inclined bottom of the wave pool 15. In FIG. 3A and the enlarged portions shown in FIG. 3B and FIG. 3C, two sets of returns/intakes are illustrated; one set is on the steep first portion of the pool bottom (45A, 50A), and the other set (45B, 50B) is on the second portion of the pool bottom with a decreased angle of inclination relative to horizontal. A filtration pump 55 filters out the debris carried by the water into the intakes (50A, 50B) and returns the water to the pressurized returns (45A, 45B). As FIG. 3A represents only one cross-section of the wave pool 15, there may be other sets of returns and intakes along other cross-sections of the wave pool 15. Thus, the wave pool 15 of the wave generating apparatus 10 of the present invention may comprise a plurality of pressurized returns 45, and/or a plurality of intakes 50, without departing from the spirit or scope of the invention. It would be obvious to one of skill of the art how to alter the number of returns and intakes based upon specific implementation. Additional sets of pressurized returns 45 and intakes 50 may more effectively push water across the pool bottom (which can include sand) to move debris through. For example, more sets of returns/intakes can help to increase the throughput and volume of water moved through the filtration system of the wave generating apparatus 10.

The wave generating chamber 40 can also experience debris buildup that can affect the wave generator operation and the water quality in the pool 15. Filtration of water in the wave pool 15 in general will help keep the wave generating chambers 40 cleaner, but it is not enough. The walls of the wave generating chambers 40 would still need to be cleaned on a regular basis because the clean filtered water is not introduced to the chambers 40. To address this filtration problem, a wave chamber pressurized return 48 may be installed in the interior of the chamber 40. The pressurized return 48, shown in FIG. 3B, may be mounted to or installed on a ceiling or a wall of the interior of the wave generating chamber 40, i.e. an interior surface. The pressurized return 48 located within the wave generating chamber 40 may be comprised of one or more sprinklers and may be used in each wave generating chamber 40, as may be the case if the wave generating apparatus 10 has multiple wave generating chambers 40. The pressurized return(s) 48 sprays pressurized filtered water on the wall(s) of the wave generating chamber 40, dislodging any debris or pool scum buildup. The water delivered to the pressurized sprinklers 48 may be increased in pressure relative to pressurized returns in the wave pool 15, to better clean the walls. A secondary pump 60 may be used to create the additional pressure needed. The system may additionally comprise an intake 50D located within the wave generating chamber 40. The intake 50D located within the chamber 40 may catch some of the debris or pool scum dislodged from the chamber walls to be filtered by the filtration pump 55.

In conjunction with the advantages and features discussed previously, the wave generating apparatus 10 may feature a wave dampening trough 30, shown in FIG. 3C. The wave dampening trough 30 comprises a first trough edge connected to the wave pool bottom and a second trough edge connected to the beach edge 25 of the wave generating apparatus 10. To more effectively dampen any wave passing over the first trough edge, the wave dampening trough 30 retains a body of water separate from the wave pool 15. When no wave generator 20 is activated, the wave pool 15 and the wave dampening trough 30 each retain a body of water having a static water level, where the top of the first trough edge is above the static water level of both the static water level of the wave pool 15 and the static water level of the wave dampening trough 30. Thus, when a wave is generated and travels from the wave generating chamber 40 towards the beach edge 25 of the wave generating apparatus 10, the top of the wave passes over the first trough edge, mixing with the body of water inside the wave dampening trough 30, and has the wave energy substantially dampened before the wave arrives at the beach edge 25. The first trough edge also prevents excess backwash from the wave to enter the wave pool 15, which improves the wave quality of successive waves generated in the wave pool 15. Such a trough, however, is more likely to retain sand and debris dislodged by the wave and washed from the beach edge 25 into the trough, if not filtered properly. Therefore, it would be advantageous for the wave dampening trough 30 to have its own set of an intake 50C and a pressurized return 45C.

FIG. 3C shows an intake 50C located along the bottom of the wave dampening trough 30, as well as a pressurized return 45C located at the top of the second trough edge, which is adjacent to the beach edge 25. As illustrated, the water released by the pressurized return 45C travels in the direction 47 towards the intake 50C located at the bottom of the trough 30. It would be an obvious variation, without departing from the spirit and scope of this invention, to locate the pressurized return 45C at the other, first edge of the trough 30, with the water traveling instead in the direction opposite 47 to the intake 50C at the trough bottom.

Optionally, the wave generating apparatus 10 could include a secondary pump 60 connected to the intake 50C inside the wave dampening trough 30 and to one or more pressurized returns 45. There are many variations possible as to how this secondary pump 60 may be operated. In one such instance, the secondary pump 60 may provide a means for a more localized filtration system specifically for the wave dampening trough 30, either in conjunction with or as a replacement to the filtration pump 55. In another instance, the secondary pump 60 may further pressurize the water released through the pressurized return 45C to the trough 30. The secondary pump 60 may further serve the functions of filling and draining the wave dampening trough 30, to either facilitate cleaning of the trough 30 or to maintain the static water level in the trough 30 at a set level or height.

To drain the wave dampening trough 30, the pressurized return 45C should be turned off so that no water flows out. There are many variations of how to turn the pressurized return 45C off, such as using valves to close or break the connection between the secondary pump 60 and the pressurized return 45C. The secondary pump 60 and the intake 50C located along the bottom of the wave dampening trough 30 may be operated to drain water from the trough 30, by pumping water from the intake 50C through the pump 60 to an outlet, such as (in a non-limiting example) a pressurized return 45B located in the wave pool 15. To fill the wave dampening trough 30 from empty or from a lower static water level, the intake 50C located at the trough bottom should be turned off so that the connection between the secondary pump 60 and the intake 50C is broken. Likewise, there are many obvious variations of how to turn off the water between the pump 60 and the intake 50C. The secondary pump 60 may pump water from other intakes 45 or filtered water from the filtration pump 55 to the pressurized return 45C in a fill mode. Thus, the secondary pump 60 and the pressurized return 45C releasing water into the wave dampening trough 30 may be operated to fill the trough 30 with water. The system of the present invention may be constructed to implement only the drain mode, to implement only the fill mode, to implement neither mode, or to implement both modes for the secondary pump 60. The drain and fill features are considered optional enhancements.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. A wave generating apparatus comprising:
   a wave pool with water comprising:
      a first deep end of the wave pool;
      a second end of the wave pool;
      a pool bottom inclining from the first, deep end toward the second end of the wave pool; and
      a beach edged located proximate to the second end of the wave pool;
   a wave generating chamber having one or more wave generators,
      adjacent to the first deep end of the wave pool; and
   a filtration system comprising:
      an intake located at a position along the pool bottom;

a pressurized return that releases pressurized water to flow in a direction along the pool bottom towards the intake; and a filtration pump that pumps water from the intake to the pressurized return while filtering debris from the water;

wherein the pressurized return is located at a higher elevation relative to the intake.

2. The wave generating apparatus of claim 1, wherein the angle of inclination moving from the first end of the wave pool toward the second end of the wave pool decreases relative to horizontal.

3. The wave generating apparatus of claim 1, the filtration system further comprising a secondary pump to pressurize the water returning to the wave pool through the pressurized return.

4. The wave generating apparatus of claim 1, wherein the wave generating chamber further comprises a wave chamber pressurized return.

5. The wave generating apparatus of claim 4, wherein the wave chamber pressurized return is a pressurized sprinkler.

6. The wave generating apparatus of claim 4, wherein the wave chamber pressurized return is mounted to an interior surface of the chamber.

7. The wave generating apparatus of claim 4, further comprising a secondary pump, wherein the wave chamber pressurized return is pressurized by the secondary pump.

8. The wave generating apparatus of claim 1, further comprising a wave dampening trough comprising a first trough edge connected to the wave pool bottom and a second trough edge connected to the beach edge, capable of retaining a body of water separate from the wave pool.

9. The wave generating apparatus of claim 8, wherein when no wave generator is activated, the wave pool and the wave dampening trough each retain a body of water having a static water level, and wherein the top of the first trough edge is above both the static water level of the wave pool and the static water level of the wave dampening trough.

10. The wave generating apparatus of claim 8, wherein the pressurized return is constructed to release water into the wave dampening trough.

11. The wave generating apparatus of claim 10, wherein the pressurized return is located at the beach edge.

12. The wave generating apparatus of claim 10, wherein the intake is located along the bottom of the wave dampening trough.

13. The wave generating apparatus of claim 12, further comprising a secondary pump connected to the intake.

14. The wave generating apparatus of claim 13, wherein the secondary pump and the intake located along the bottom of the wave dampening trough may be operated to drain water from the trough.

15. The wave generating apparatus of claim 13, wherein the secondary pump and the pressurized return releasing water into the wave dampening trough may be operated to fill the trough with water.

16. The wave generating apparatus of claim 1, comprising: a second intake located at a second position along the pool bottom;

a second pressurized return that releases pressurized water to flow in a direction along the pool bottom towards the second intake;

wherein the filtration pump pumps water from the second intake to the second pressurized return while filtering debris from the water; and wherein the pressurized return is located at a higher elevation relative to the second pressurized return, and the intake is located at a higher elevation than the second intake.

17. The wave generating apparatus of claim 1, comprising a plurality of intakes.

18. The wave generating apparatus of claim 1, comprising a plurality of pressurized returns.

19. A wave generating apparatus comprising: a wave pool;

a wave generating chamber adjacent to an edge of the wave pool; and a filtration system comprising:

a pressurized return within the wave generating chamber that releases pressurized water against a wall of the wave generating chamber to dislodge debris on the wall;

an intake located to catch debris dislodged from the wall of the wave generating chamber by the pressurized water from the pressurized return; and a filtration pump that pumps water from the intake to the pressurized return while filtering debris from the water.

20. The wave generating apparatus of claim 19, wherein the wave generating chamber comprises a plurality of walls, further comprising a wave chamber pressurized return that coats the plurality of walls with water to dislodge debris and pool scum buildup from the plurality of walls.

21. The wave generating apparatus of claim 20, wherein the wave chamber pressurized return comprises a sprinkler.

22. The wave generating apparatus of claim 19, wherein the intake is located within the wave generating chamber.

23. The wave generating apparatus of claim 19, comprising a plurality of intakes.

24. The wave generating apparatus of claim 19, comprising a plurality of wave chamber pressurized returns.

* * * * *